United States Patent [19]

Wicklund

[11] Patent Number: 4,513,527

[45] Date of Patent: Apr. 30, 1985

[54] ANIMAL TRAP

[76] Inventor: Dale L. Wicklund, Rte. 2, Box 157A, Deer River, Minn. 56636

[21] Appl. No.: 436,010

[22] Filed: Oct. 22, 1982

[51] Int. Cl.³ ............................................ A01M 23/34
[52] U.S. Cl. ....................................... 43/87; 124/31; 43/86
[58] Field of Search .................. 43/86, 87, 6; 124/37, 124/41 R, 31, 16, 66–68, 27; 294/61

[56] References Cited

U.S. PATENT DOCUMENTS

| | | | |
|---|---|---|---|
| 1,467,846 | 9/1923 | Dugas . | |
| 1,540,640 | 6/1925 | Lewis . | |
| 1,865,920 | 7/1932 | Knippelmeier . | |
| 1,907,360 | 5/1933 | Morrill . | |
| 2,168,132 | 8/1939 | Marshall | 43/87 |
| 2,240,418 | 4/1941 | Risher et al. | 43/87 |
| 2,578,663 | 12/1951 | Beaupre | 43/18.1 |
| 2,700,844 | 2/1955 | Pastuck | 43/87 |
| 2,704,052 | 3/1955 | Wood | 43/87 |
| 3,540,769 | 11/1970 | Rosser | 43/6 |
| 3,797,488 | 3/1974 | Hurschman et al. | 124/37 |
| 3,949,514 | 4/1976 | Ramsey | 43/87 |
| 4,179,837 | 12/1979 | Gummeringer | 43/87 |
| 4,208,827 | 6/1980 | Starkey | 43/86 |
| 4,250,653 | 2/1981 | Davies | 43/87 |

Primary Examiner—Nicholas P. Godici
Assistant Examiner—Kurt Rowan
Attorney, Agent, or Firm—Merchant, Gould, Smith, Edell, Welter & Schmidt

[57] ABSTRACT

An animal trap and ball detent trigger means therefor is disclosed. The trap is of shaft and block construction with the cable carrying block spring biased toward one end of the shaft. The shaft is longitudinally bored at one end thereof with a transverse bore intersecting the longitudinal bore for receiving ball bearings to be used for detaining the cable carrying block in a set position against a spring bias. A plunger extends into the longitudinal bore for reciprocating between a position holding the ball bearings in a block detaining position and a position in which the ball bearings may be forced inwardly into the shaft to release the block. The plunger and a trigger member are spring biased in a home set position. The trigger member has a conically shaped end which rests in a correspondingly conically shaped trigger block with one end of the plunger in spring bias contact therewith. The disturbance of the trigger member from its home position causes the trigger to rock in its conical recess and thereby apply a reciprocating lateral force to the plunger releasing the detaining force of the balls from the cable block.

5 Claims, 4 Drawing Figures

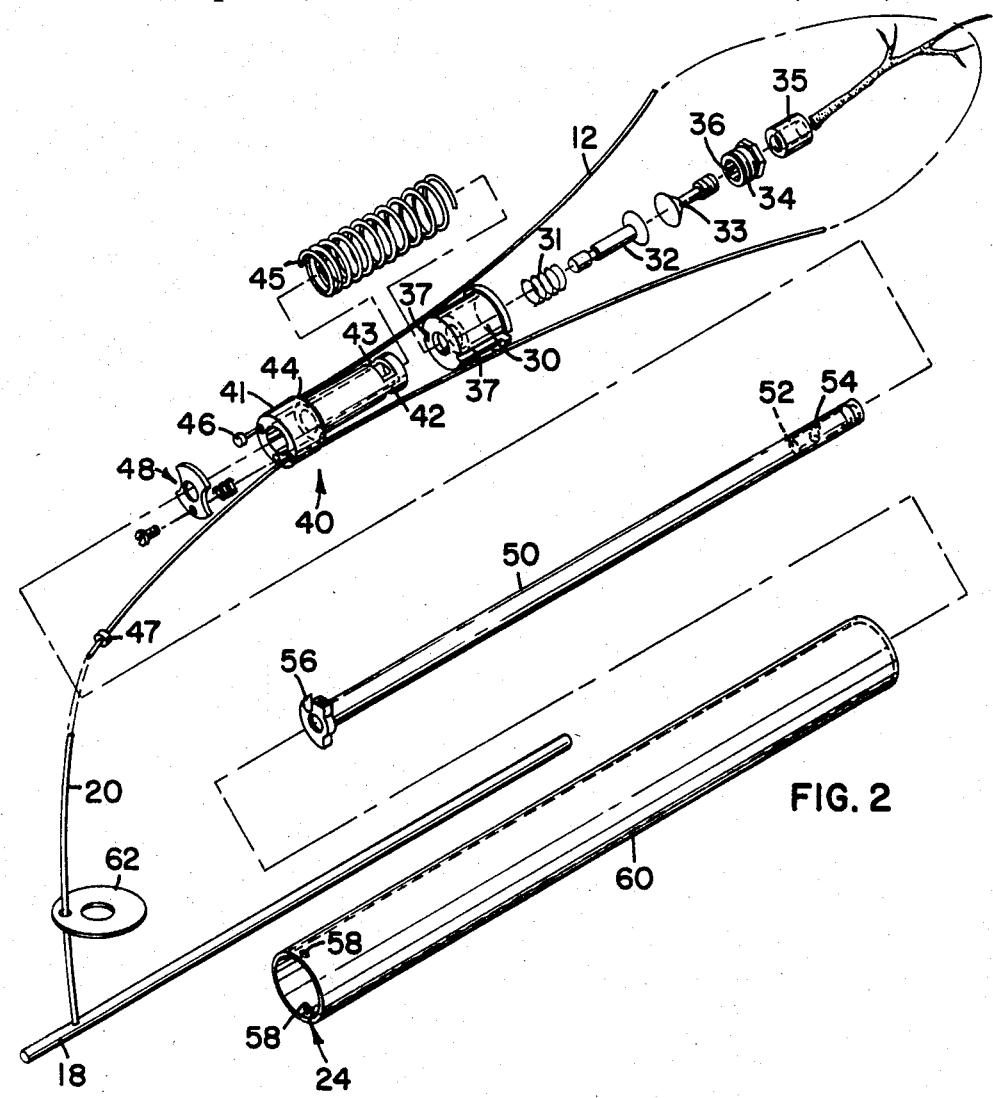
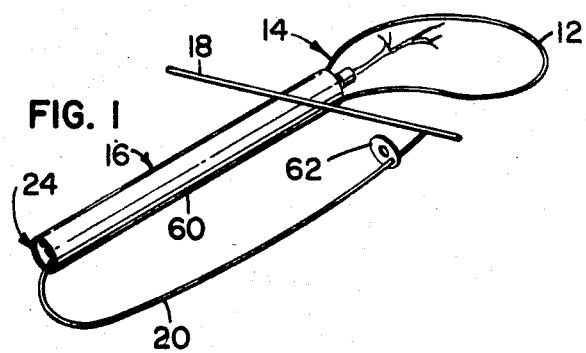

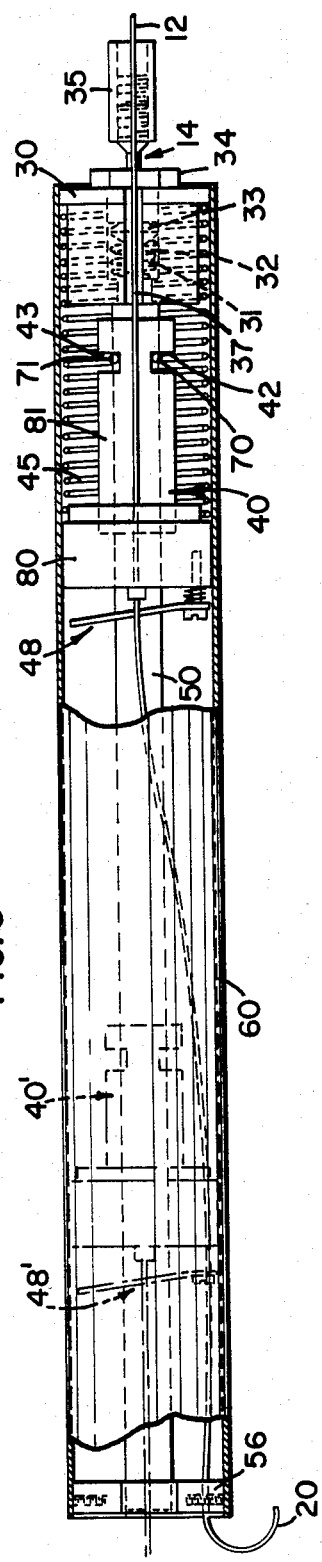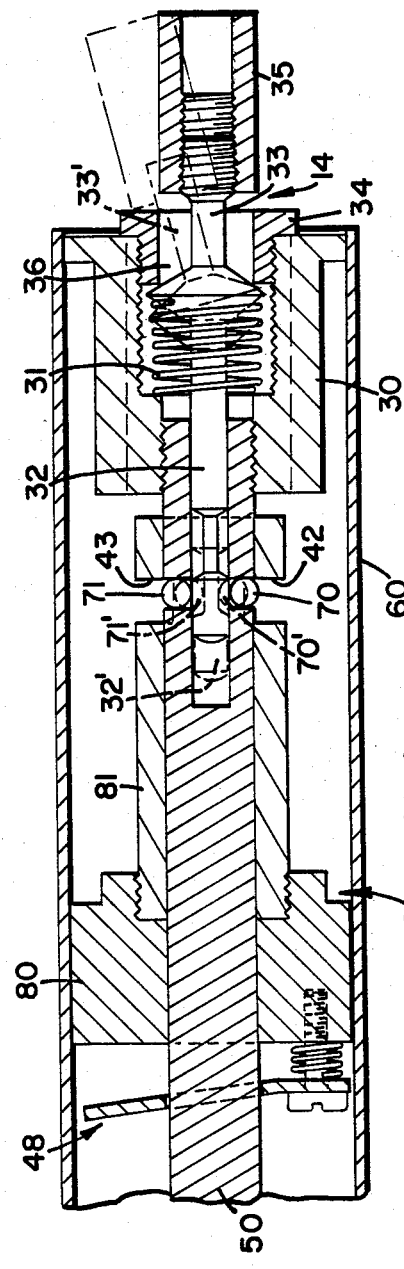
FIG. 3
FIG. 4

4,513,527

ANIMAL TRAP

BACKGROUND OF THE INVENTION

This invention is in the field of animal traps and, more particularly, is directed towards trigger mechanisms therefor.

Many types of animal traps and various mechanisms for the triggering thereof are known in the art. The usual prior art mechanism employed for setting and triggering a trap in includes a latch member for holding the trap in a set position and a hingably connected release member for releasing the latch when downward force is applied thereto. Normally, the hinged member has a fulcrum or pivot point which determines the axis or axes of sensitivity of the trigger mechanism. Accordingly, most trigger mechanisms have only one axis of sensitivity or are more sensitive in one axis then the other(s).

Characteristically, the latch member of the above described trigger mechanisms has a hitching or hooking portion with sharply defined edges or surfaces to provide a slip-free latch. Naturally, these edges or surfaces are sites for pressure points and are therefore subject to considerable friction wear and tear. Eventually, this wear can result in altered triggering characteristics which may render the trap ineffectual or so unpredictable as to be potentially dangerous for the trap setter.

Generally, increases in the axial sensitivity of trigger mechanisms have been accompanied by corresponding increases in the complexity of the trigger mechanism. For example, U.S. Pat. No. 2,700,844 discloses an animal trap having a trigger sensitive in two axis of movement, but which requires an electrical power source and which is characterized by a relatively complicated triggering mechanism. From an operational and manufacturing point of view, this increased complexity is undesirable as it usually leads to lower reliability and increased cost of production.

The present invention seeks to avoid the above outlined disadvantages of prior art trigger mechanisms by providing a relatively simple trigger mechanism having enhanced axial sensitivity and wear resistant construction.

SUMMARY OF THE INVENTION

The present invention provides an animal trap comprising means for spring biasing an entrapping member, ball detent means for holding the entrapping member in a set position and trigger means operable when disturbed for causing the detent means to release the entrapping member.

In a preferred embodiment there is provided a shaft and block assembly with the block slidably mounted on the shaft and biased toward one end thereof, with a flexible loop member secured at at least one end to the block for entrapping an animal. The shaft has ball detent means mounted therein for holding the block in a set position, with a trigger means operably associated with the ball detent means for causing the ball detent means to release the block from a set position when the trigger is disturbed.

In accordance with a more specific aspect of the trigger and ball detent, the shaft includes a longitudinal bore and transverse bore intersecting therewith for receiving a plunger and balls respectively. The plunger comprises an elongated member with a recess therein, the recess positionally associated with the location of the balls when the plunger is operationally positioned in the longitudinal bore whereby detent force may be applied to and released from the balls in response to longitudinal movement of the plunger. The release trigger comprises an elongated member conically shaped at one end and means for spring biasing the conical head in a correspondingly shaped recess so that the trigger normally rests in a home position. In operation, one end of the plunger is seated against the conical trigger head and biased so as to hold the balls in a detent position. When the trigger is disturbed from its home position, a longitudinal force is applied to the plunger causing the recess to align with the balls whereby the ball detent force is released and the entrapping member is closed.

BRIEF DESCRIPTION OF THE DRAWINGS

FIG. 1 is a perspective view of an animal trap according to the present invention;

FIG. 2 is an exploded perspective view of the animal trap depicted in FIG. 1;

FIG. 3 is a side elevation with a portion thereof broken away of the animal trap depicted in FIG. 1; and FIG. 4 is an enlarged fragmentary view of the trigger mechanism of the animal trap according to the present invention.

DETAILED DESCRIPTION OF THE PREFERRED EMBODIMENT

Referring to FIG. 1, there is shown a perspective view of the present invention. Animal snaring cable 12 and trigger member 14 extend from one end of the housing 16. A tie down cable 20, which in the preferred embodiment comprises one end of cable 12, is connected to a tie down stake and trap setting plunger 18. As will be further explained below, the trap is set by inserting stake 18 into an aperture in end 24.

Referring to FIG. 2, an exploded perspective view of the present invention is illustrated. The trigger mechanism includes parts 30–35. One end of plunger 32 is spring biased against conically headed member 33, which is seated in a corresponding conical recess 36 of threaded member 34. A threaded cap 35 attaches to one end of member 33 to provide a recess or hole into which a twig or small branch is inserted for extending the trigger.

A shaft 50 is inserted through the axial openings of cable block assembly 40 and spring 45 and threadably connected to a shoulder block 30 to spring bias block assembly 40 away from the trigger mechanism. Spring 45 is shown cut away at one end thereof, but it will be understood that it is preferably somewhat longer than shaft 50, so that ample compression force may be obtained. The block 41 of cable block assembly 40 includes a shoulder 44 like that of block 30, the shoulders tailored to receive the respective ends of spring 45. A block locking apparatus 48, which allows block 41 to slide freely in a direction away from the trigger end of the trap but which inhibits movement in the other direction, provides means for retaining cable 12 in a closed position after the entrapment of an animal. Stop members 46 and 47 are provided on cable 12 for engaging the block assembly 40 and holding the cable 12 in a fixed relationship thereto. Stop member 47 may be adjusted to provide a selectable trapping loop size. Block 30 has grooves 37, to provide a guide and passageway for cable 12 on either side thereof.

Shaft 50 includes a longitudinal bore 52 and transverse bore 54. Ball bearings are inserted and crimped into the transverse bore holes. Plunger 32 extends into bore 52 whereby reciprocation of the plunger applies and releases detent force to the balls. Notches 42 and 43 in block 41 cooperate with the ball bearings to provide a ball detent latch and release triggering system.

A housing 60 is provided for the above described assembly and is held in place with end member 56 and set screws extending through holes 58 into respective threaded recesses of member 56. Washer member 62 is provided for the case where it is desired to immovably secure the trap by wrapping cable 20 around a bush, small tree or the like, stake 18 being inserted through the large hole in member 62 to form a noose thereabout.

To set the trap, tie down stake and trap setting rod 18 is inserted into end 24 of housing 60 contacting spring biased latch apparatus 48 whereby the latching force is released from shaft 50 and the cable block assembly 40 may be forced forward along the shaft so that slots 42 and 43 my engage the ball detent to set the trap.

FIG. 3 is a side elevation of the present invention illustrated in FIGS. 1 and 2, with a portion thereof broken away. In the elevation, sliding cable block assembly 40 is shown in a set position with ball bearings 70 and 71 engaging the respective notches 42 and 43. Spring 45 is held in a compressed condition exerting an expansive force between cable block assembly 40 and trigger block 30. When the radially outward force is released from bearings 70 and 71, notches 42 and 43 slide thereover and cable block assembly 40 is rapidly forced to the phantom position identified by reference numeral 40', thereby closing the cable loop. Once the trap is closed, assembly 40' is held in its position by locking mechanism 48' and by the force of spring 45.

FIG. 4 is an enlarged fragmentary view illustrating the trigger mechanism and block assembly 40. In the view, plunger 32, member 33 and balls 70 and 71 are shown in a set position, and in a trap closed position indicated by phantom lines and corresponding primed numerals. In a set position, member 33 is biased by spring 31 to an axially centralized home position, and plunger 32 is biased to hold balls 70 and 71 in a detaining relationship with the respective notches 42 and 43 of member 81, which together with member 80 and locking apparatus 48 form cable block assembly 40. When member 33 is upset from its home position, for example, to the position illustrated by reference numeral 33', the conical head thereof rocks in recess 36 of member 34 and pushes plunger 32 to its position as indicated by reference numeral 32'. Detent balls 70 and 71 are thereby pushed into the recessed portion of plunger 32 by the force exerted via notches 42 and 43 of member 81, whereby cable block 40 is forced by spring 45 (not shown in FIG. 4) to its trap closed position. It will be observed that triggering occurs whenever trigger member 14 is disturbed from its normal home position including disturbances applied to trigger member 14 in an inward longitudinal direction. Thus, a "three axis" triggering mechanism is provided, allowing greater flexibility in locating the trap in the natural environment and providing triggering characteristics which are substantially independent from animal positioning and movement. While the ball detent and plunger arrangement illustrated does not provide for triggering in response to forces applied in a longitudinal direction away from the trap, it will be seen that such "omni-directional" triggering sensitivity may be provided by utilizing a double detent arrangement, wherein plunger 32 would have dual recesses and member 33 would be spring biased in both longitudinal directions.

While the operation of the above described trap is self-evident, a brief review will be given. When the desired location for the trap is found, for example near animal holes, dens or underwater runs, the user inserts a suitable twig or branch into trigger member 14 and sets the trap by inserting stake 18 into end 24 of the trap, stake 18 releasing the locking force of assembly 48 in addition to compressing spring 45 and moving block assembly 40 to its set position. Once set, the trap may be anchored by driving stake 18 into the ground, or by securing the stake end of the cable in any suitable fashion to an immovable object such as a tree. If necessary, a bate may be located within the cable 12 loop, after which the trap area is exited by the user. Thereafter, disturbance of the trigger member 14 or the twig or branch connected thereto will cause the trap to close, ensnaring the neck, body or limb of the encroaching animal. Preferably, the trap is positioned so that the animal is ensnared around the neck, whereby their demise is swift and humane. With the trap closed, locking apparatus 48 prevents block 41 and cable 12 from moving towards a set position, whereby the animal is securely detained.

While the present invention has been illustrated in its preferred embodiment, it shall be understood that it is not limited thereto. For example, the trigger and ball detent concept is easily adaptable to jaw-type traps, or other variations of the shaft and block trap herein

I claim:

1. An animal trap comprising:
   an animal entrapping assembly, said animal entrapping assembly including a shaft, cable block assembly, shoulder block and cable, said block being slidably mounted on said shaft, said cable having a first end attached to said cable block, said cable thereafter externally parallelling said shaft an passing within a first longitudinal groove on said shoulder block, said cable having a second end passing within a second longitudinal groove diametrically opposite to said first longitudinal groove on said shoulder block such that a loop is formed by said cable, said shoulder block being threadably mounted on said shaft;
   spring means connected for biasing said entrapping assembly toward a closed position;
   ball detent means for releasably holding the entrapping assembly in a set position; and
   trigger means interactive with said ball detent means and operative when disturbed in either direction along any axis to cause said ball detent means to release said entrapping assembly from the set position allowing said spring means to move the entrapping assembly to a closed position.

2. An animal trap comprising:
   an animal entrapping assembly, said animal entrapping assembly including a shaft, block and cable, said cable being slidably mounted on said shaft and having at least one end of said cable secured thereto;
   spring means connected for biasing said entrapping assembly toward a closed position;
   ball detent means for releasably holding the entrapping assembly in a set position, said ball detent means being operatively mounted in said shaft for releasably engaging said block, said ball detent means including two ball bearings crimpably mounted within a transverse bore through said shaft, said ball bearings being biased by a variably diametered plunger, said plunger being mounted slidably within a longitudinal bore through said transverse bore; and trigger means interactive with said ball detent means and operative when disturbed in either direction along any axis to cause said ball detent means to release said entrapping assembly from the set position allowing said spring means to move the entrapping assembly to a closed position.

3. An animal trap according to claim 2 wherein said ball detent means is operatively mounted in said shaft for releasably engaging said block.

4. An animal trap comprising:

an animal entrapping assembly, said animal entrapping assembly including a shaft, block and cable, a block slidably mounted on the shaft annd having at least one end of the cable secured thereto;

spring means connected for biasing said entrapping assembly toward a closed position;

means for releasably holding said entrapping assembly toward a set position, wherein said releasable holding means includes a ball detent, said ball detent including two ball bearings crimpably mounted within a transverse bore through said shaft, said ball bearings being biased by a variably diametered plunger, said plunger being mounted slidably within a longitudinal bore through said transverse bore; and omni-directional trigger means mechanically interactive with said releasable holding means and operative when disturbed to cause release of said entrapping assembly from the set position allowing said spring means to move the entrapping assembly to a closed position.

5. An animal trap according to claim 4 wherein said trigger means includes a spring biased rockably mounted member and a plunger in operative contact therewith, said rockably mounted member applying longitudinal force to said plunger when disturbed from the spring biased position.

* * * * *